(12) United States Patent
Krohn et al.

(10) Patent No.: US 8,020,200 B1
(45) Date of Patent: *Sep. 13, 2011

(54) STATEFUL FIREWALL PROTECTION FOR CONTROL PLANE TRAFFIC WITHIN A NETWORK DEVICE

(75) Inventors: Robert M. Krohn, Palo Alto, CA (US); Sankar Ramamoorthi, San Jose, CA (US); Michael Freed, Pleasanton, CA (US); Keith Holleman, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 12/476,083

(22) Filed: Jun. 1, 2009

Related U.S. Application Data (63) Continuation of application No. 10/916,021, filed on Aug. 11, 2004, now Pat. No. 7,546,635.

(51) Int. Cl.
*G06F 9/00* (2006.01)

(52) U.S. Cl. ............ 726/11; 726/14; 709/223; 709/224; 709/227; 709/229; 709/238; 709/240; 709/241; 709/242; 370/351; 370/392; 370/400; 370/401; 370/428

(58) Field of Classification Search ............... 726/11
See application file for complete search history.

(56) References Cited

U.S. PATENT DOCUMENTS

| | | | |
|---|---|---|---|
| 3,962,681 A | 6/1976 | Requa et al. | |
| 4,032,899 A | 6/1977 | Jenny et al. | |
| 4,600,319 A | 7/1986 | Everett, Jr. | |
| 5,375,216 A | 12/1994 | Moyer et al. | |
| 5,408,539 A | 4/1995 | Finlay et al. | |
| 5,490,252 A | 2/1996 | Macera et al. | |
| 5,509,123 A | 4/1996 | Dobbins et al. | |
| 5,530,958 A | 6/1996 | Agarwal et al. | |
| 5,568,471 A | 10/1996 | Hershey et al. | |
| 6,011,795 A | 1/2000 | Varghese et al. | |
| 6,018,765 A | 1/2000 | Durana et al. | |
| 6,148,335 A | 11/2000 | Haggard et al. | |
| 6,182,146 B1 | 1/2001 | Graham-Cumming, Jr. | |
| 6,219,706 B1 * | 4/2001 | Fan et al. | 709/225 |
| 6,279,035 B1 * | 8/2001 | Brown et al. | 709/224 |
| 6,321,338 B1 | 11/2001 | Porras et al. | |
| 6,392,996 B1 | 5/2002 | Hjalmtysson | |
| 6,499,088 B1 | 12/2002 | Wexler et al. | |
| 6,563,796 B1 | 5/2003 | Saito | |
| 6,584,548 B1 | 6/2003 | Bourne et al. | |
| 6,590,898 B1 | 7/2003 | Uzun | |

(Continued)

OTHER PUBLICATIONS

Office Action from U.S. Appl. No. 11/516,878, dated Apr. 16, 2010, 39 pp.

(Continued)

*Primary Examiner* — Edan Orgad
*Assistant Examiner* — Ronald Baum
(74) *Attorney, Agent, or Firm* — Shumaker & Sieffert, P.A.

(57) ABSTRACT

A network device receives control plane packets and data plane packets from a network. The network device includes a forwarding component that forwards the data plane packets in accordance with routing information maintained by a routing component. The forwarding component directs the control plane packets to a firewall component that processes the control plane packets to apply firewall services and detect network attacks. After processing, the firewall component loops the control plane packets back to the forwarding components for forwarding to the routing component. The firewall component may be a security service card.

23 Claims, 5 Drawing Sheets

U.S. PATENT DOCUMENTS

| | | |
|---|---|---|
| 6,594,268 B1 | 7/2003 | Aukia et al. |
| 6,598,034 B1 | 7/2003 | Kloth |
| 6,633,563 B1 | 10/2003 | Lin et al. |
| 6,651,098 B1 | 11/2003 | Carroll et al. |
| 6,735,201 B1 | 5/2004 | Mahajan et al. |
| 6,751,663 B1 | 6/2004 | Farrell et al. |
| 6,826,713 B1 | 11/2004 | Beesley et al. |
| 6,870,817 B2 | 3/2005 | Dolinar et al. |
| 6,970,943 B1 | 11/2005 | Subramanian et al. |
| 6,975,628 B2 | 12/2005 | Johnson et al. |
| 6,983,294 B2 | 1/2006 | Jones et al. |
| 6,985,956 B2 | 1/2006 | Luke et al. |
| 7,031,304 B1 | 4/2006 | Arberg et al. |
| 7,055,174 B1 | 5/2006 | Cope et al. |
| 7,058,974 B1 | 6/2006 | Maher, III et al. |
| 7,114,008 B2 | 9/2006 | Jungck et al. |
| 7,162,740 B2 | 1/2007 | Eastlake, III |
| 7,185,368 B2 | 2/2007 | Copeland, III |
| 7,203,740 B1 | 4/2007 | Putzolu et al. |
| 7,292,573 B2 | 11/2007 | LaVigne et al. |
| 7,301,899 B2 | 11/2007 | Goldstone |
| 7,362,763 B2 | 4/2008 | Wybenga et al. |
| 7,369,557 B1 | 5/2008 | Sinha |
| 7,433,966 B2 | 10/2008 | Charny et al. |
| 7,478,155 B2 * | 1/2009 | Couturier et al. ............. 709/224 |
| 7,496,955 B2 | 2/2009 | Akundi et al. |
| 7,546,635 B1 | 6/2009 | Krohn et al. |
| 7,561,569 B2 | 7/2009 | Thiede |
| 7,580,356 B1 | 8/2009 | Mishra et al. |
| 7,596,807 B2 * | 9/2009 | Ptacek et al. .................... 726/11 |
| 2002/0095492 A1 | 7/2002 | Kaashoek et al. |
| 2002/0126621 A1 | 9/2002 | Johnson et al. |
| 2002/0141343 A1 | 10/2002 | Bays |
| 2003/0005145 A1 | 1/2003 | Bullard |
| 2003/0014665 A1 | 1/2003 | Anderson et al. |
| 2003/0097557 A1 | 5/2003 | Tarquini et al. |
| 2003/0110274 A1 | 6/2003 | Pazi et al. |
| 2003/0120769 A1 | 6/2003 | McCollom et al. |
| 2003/0214913 A1 | 11/2003 | Kan et al. |
| 2004/0015721 A1 | 1/2004 | Eastlake, III |
| 2004/0078485 A1 | 4/2004 | Narayanan |
| 2004/0107286 A1 | 6/2004 | Larson et al. |
| 2004/0111635 A1 | 6/2004 | Boivie et al. |
| 2004/0196843 A1 * | 10/2004 | Zinin ............................ 370/389 |
| 2004/0255202 A1 * | 12/2004 | Wong et al. ....................... 714/43 |
| 2005/0144441 A1 | 6/2005 | Govindarajan |
| 2005/0160289 A1 | 7/2005 | Shay |
| 2006/0089994 A1 | 4/2006 | Hayes |
| 2006/0185008 A1 | 8/2006 | Le et al. |
| 2007/0076658 A1 | 4/2007 | Park et al. |
| 2007/0121812 A1 | 5/2007 | Strange et al. |
| 2007/0180511 A1 | 8/2007 | Eastlake, III |
| 2007/0294369 A1 | 12/2007 | Ginter et al. |
| 2009/0232150 A1 | 9/2009 | Mistry |

OTHER PUBLICATIONS

Response to Office Action dated Apr. 16, 2010, from U.S. Appl. No. 11/516,878, filed May 24, 2010, 13 pp.

Notice of Allowance from U.S. Appl. No. 11/516,878, mailed Jun. 14, 2010, 8 pp.
"The CAIDA Web Site," www.caida.org.
"About Endace," www.endace.com.
"Cisco IOS NetFlow," www.cisco.com/warp/public/732/Tech/nmp/netflow/index.shtml.
U.S. Appl. No. 10/188,567, entitled "Adaptive Network Flow Analysis", filed Jul. 2, 2002, Scott Mackie.
U.S. Appl. No. 10/228,132, entitled "Adaptive Network Router", filed Aug. 26, 2002, Woo et al.
U.S. Appl. No. 10/228,114, entitled "Network Router Having Integrated Flow Accounting and Packet Interception", filed Aug. 26, 2002, Woo et al.
U.S. Appl. No. 10/241,785, entitled "Rate-Controlled Transmission of Traffic Flow Information", filed Sep. 10, 2002, Sandeep Jain.
U.S. Appl. No. 10/228,150, entitled "Network Device Having Accounting Service Card," filed Aug. 22, 2002, Woo, Hsien-Chung.
U.S. Appl. No. 10/839,187, entitled "Port Scanning Mitigation Within A Network," filed May 5, 2004.
U.S. Appl. No. 12/182,619, filed Jul. 30, 2008, entitled, "Streamlined Packet Forwarding Using Dynamic Filters For Routing and Security in a Shared Forwarding Plane".
"Well-Known TCP Port Number," www.webopedia.com, 3 pages.
"TCP Packet Field Descriptions," www.ipanalyser.co.uk, Analyser Sales Ltd., Copyright 2003, 2 pages.
Michael Egan, "Decomposition of a TCP Packet," www.passwall.com, 3 pages, Aug. 7, 2000.
Mark Gibbs, "A Guide to Original SYN," www.nwfusion.com, Network World, Nov. 2000, 4 pages.
"Sample TCP/IP Packet," www.passwall.com, Version 0.0.0 @ 03:55/Aug. 7, 2000, Copyright 2002, 6 pages.
D.J. Bernstein, "SYN Cookies," http://cr.yp.to/syncookies.html, Oct. 2003, 3 pages.
Jonathan Lemon, "Resisting SYN Flood DoS Attacks with a SYN Cache," http://people.freebsd.org/~jlemon/papers/syncache.pdf, 9 pages.
Stuart Staniford, et al., "Practical Automated Detection of Stealthy Portscans," http://downloads.securityfocus.com/library/spice-ccs2000.pdf, 16 pages.
Juniper Networks, Inc., "Combating Bots and Mitigating DDoS Attacks," Juniper Networks, Inc., 2008, entire document, http://www.juniper.net/solutions/literature/solutionbriefs/351198.pdf.
Weaver, A.C. et al., "A Real-Time Monitor for Token Ring Networks," Military Communications Conference, 1989, MILCOM '89, Oct. 1989, vol. 3, pp. 794-798.
Dini, P. et al., "Performance Evaluation for Distributed System Components," Proceedings of IEEE Second International Workshop on Systems Management, Jun. 1996, pp. 20-29.
Integrated Services Adapter, 2000, Cisco Systems, Data Sheet, pp. 1-6, http://www.cisco.com/warp/public/cc/pd/ifaa/svaa/iasvaa/prodlit/ism2_ds.pdf.
Office Action from U.S. Appl. No. 12/182,619, dated Sep. 24, 2010, 23 pp.
Response to Office Action dated Sep. 24, 2010, for U.S. Appl. No. 12/182,619, dated Dec. 21, 2010, 16 pp.

* cited by examiner

STATEFUL FIREWALL PROTECTION FOR CONTROL PLANE TRAFFIC WITHIN A NETWORK DEVICE

This application is a Continuation of U.S. application Ser. No. 10/916,021, filed Aug. 11, 2004, the entire contents of which is incorporated herein by reference.

TECHNICAL FIELD

The invention relates to computer networks and, more particularly, to techniques for protecting devices within networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Conventional routers often maintain the routing information in the form of one or more routing tables or other data structures. The form and content of the routing tables often depend on the particular routing algorithm implemented by the router.

Upon receiving incoming packets, the routers examine information within the packets, and forward the packets to other devices within the network in accordance with the routing information. In order to maintain an accurate representation of the network, routers exchange routing information in accordance with routing protocols, such as the Border Gateway Protocol (BGP), the Intermediate System to Intermediate System (ISIS) protocol, the Open Shortest Path First (OSPF) protocol, and the Routing Information Protocol (RIP).

When two routers initially connect, they typically exchange routing information. From then on, the routers send control messages to incrementally update the routing information when the network topology changes. For example, the routers may send update messages to advertise newly available routes, and to withdraw routes that are no longer available. The control messages communicated between network devices, such as routers, is often referred to "control plane" network traffic. In contrast, the network traffic received and forwarded by a router is often referred to as "data plane" network traffic.

A network device, such as a router, server, workstation, or other device, can be susceptible to a network attack. A denial of service (DoS) attack, for example, occurs when a malicious party directs a high volume of packets to the network device in an attempt to sabotage network operation. The high volume of traffic can overwhelm the network device, leaving it unable to process other packets. For example, in one type of DoS attack, a perpetrator sends a large number of "ping" requests to network broadcast addresses, which are special addresses used to broadcast messages to other devices on the network. When sending the requests, the perpetrator spoofs the source address of a network device targeted by the attack. In response to the requests, the other network devices reply to the targeted routing device, thereby inundating the targeted routing device with packets.

One technique for preventing or otherwise reducing the effects of attacks on devices within a network is to introduce a "firewall." The firewall is often a dedicated device that provides stateful analysis (i.e., inter-packet analysis) of the network traffic, and is typically placed between the network and a router coupled to an external network, i.e., "behind" the router. Placing the firewall behind the router protects devices within the network, but leaves the router exposed to external network attacks.

Another technique is to place the firewall between the router and the external network, such as a service provide network. This technique, however, may adversely impact the bandwidth available to receive traffic from the external network as the firewall is typically unable to match the level of bandwidth supported by the router.

SUMMARY

In general, the invention is directed to techniques for providing firewall protection to control plane traffic of a network device. For example, a network device, such as a router, identifies control plane traffic for the network device, and selectively applies firewall analysis to the control plane traffic without impeding the processing of data plane traffic. In other words, firewall protection is provided for the control plane packets destined for the network device. However, other network traffic forwarded by the device, i.e., data plane traffic, need not be similarly analyzed.

In one embodiment, a method comprises receiving control plane packets and data plane packets with a network device, and forwarding the control plane packets to a firewall component within the network device. The method further comprises processing the control plane packets with the firewall component to detect a network attack.

In another embodiment, a method comprises receiving control plane packets and data plane packets with a control unit of a router, wherein the control unit includes a forwarding component and a routing component. The method further comprises forwarding the data plane packets to an output interface with the forwarding component, processing the control plane packets with a firewall component, and forwarding the control plane packets to the routing component after processing.

In another embodiment, a network device comprises a physical interface card that receives control plane packets and data plane packets from a network, a firewall component that processes the control plane packets to detect a network attack, and a forwarding component that directs the control plane packets to the firewall component.

In another embodiment, the invention is directed to a computer-readable medium containing instructions. The instructions cause a programmable processor to receive control plane packets and data plane packets within a router, forward the data plane packets to an output interface in accordance with routing information, and forward the control plane packets to a routing component after the control plane packets are process with a firewall component within the router.

Embodiments of the invention may provide one or more advantages. For example, the techniques provide a simple and effect security treatment of control plane traffic for a network device, such as a router. As only control plane traffic is identified and analyzed, e.g., via a firewall service card, data plane traffic may be relatively unaffected. For example, customer traffic handled by the network device may not necessarily experience bandwidth degradation even though stateful firewall analysis is performed on the control plane traffic. In this manner, the firewall protection for the network device may be relatively transparent to data plane traffic handled by the network device.

Moreover, the techniques may be utilized to provide "stateful" firewall services on the control place traffic. As used herein, the term "stateful" firewall services refers to firewall services that provide inter-packet analysis, i.e., services that generate and maintain state information between control plane packets. The techniques may allow even high-bandwidth routing device to apply stateful firewall protection of the routing device without substantially affecting data plane traffic.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
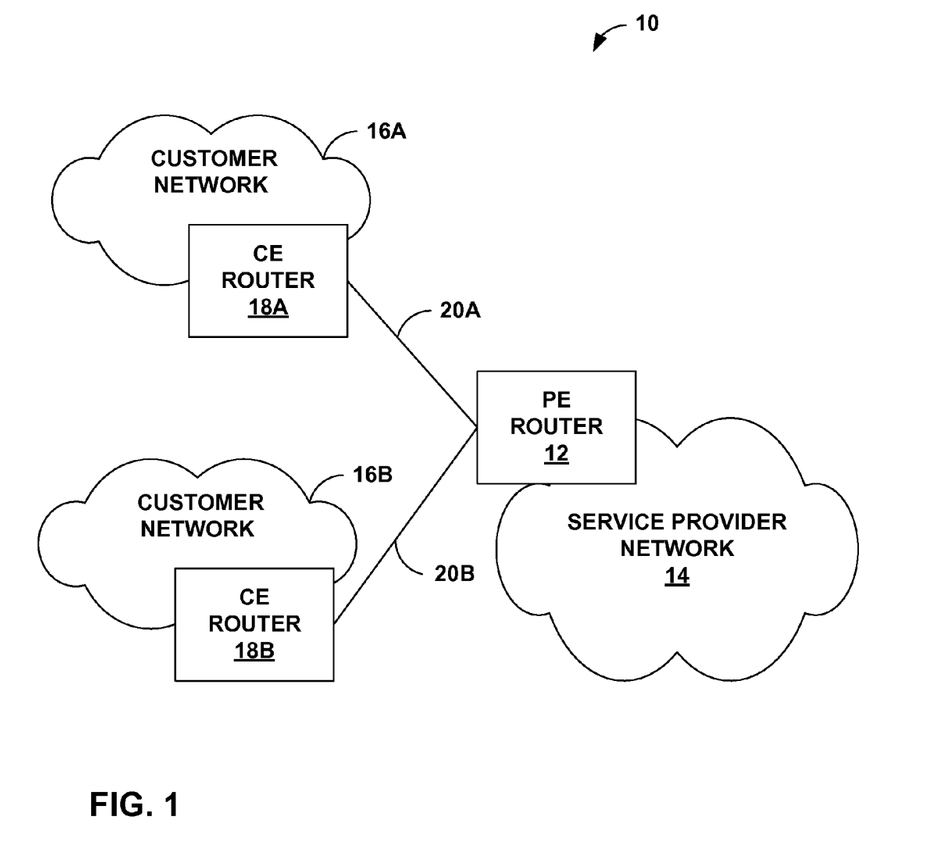
FIG. 1 is a block diagram illustrating an example system in which a provider edge (PE) router provides firewall services for control plane traffic.

FIG. 1 is a block diagram illustrating an example system 10 in which a provider edge (PE) router 12 provides firewall services to control plane traffic. The term "control plane traffic," as used herein, refers to network packets that are destined to a "control plane" of PE router 12. A routing protocol communication, such as a packet that conforms to the Border Gateway Protocol (BGP), is one example of control plane traffic.

In the illustrated example of FIG. 1, PE router 12 is an edge router of a service provider network 14 administered by a network service provider, and provides connectivity for customer networks 16A and 16B (collectively, "customer networks 16"). In particular, PE router 12 is coupled to customer edge routers 18A and 18B (collectively, "customer edge routers 18") of customer networks 16 via access links 20A and 20B, respectively. Each of customer networks 16 may be a network for a site of an enterprise. Each of customer networks 16 may include one or more computing devices (not shown), such as personal computers, laptop computers, handheld computers, workstations, servers, switches, printers, or other devices.

Service provider network 14 may be coupled to one or more networks administered by other service providers, and may thus form part of a large-scale public network infrastructure, e.g., the Internet. The service provider may provide computing devices within customer networks 16 with access to the Internet via service provider network 14, which allows computing devices within one of customer sites 16 to communicate with computing devices within the Internet or the other one of customer networks 16. Service provider network 14 may include a variety of other network devices (not shown), such as routers, switches, servers, and the like and may be connected to other networks.

The configuration of the network environment illustrated in FIG. 1 is merely exemplary. For example, service provider network 14 may include any number of provider edge routers coupled to one or more customer networks. Nonetheless, for ease of description, only a single PE router 12 coupled to customer networks 16 is illustrated in FIG. 1.

In accordance with the principles of the invention, PE router 12 provides firewall services to control plane traffic. Moreover, in some embodiments, PE router 12 may apply the firewall services only to the control plane traffic without affecting data plane traffic, i.e., traffic that is forwarded through PE router 12 to other computing devices. As described in further detail herein, PE router 12 identifies a packet destined for the control plane of the router, such as a routing protocol communication, and applies one or more firewall services to the identified control plane packet. If PE router 12 identifies a packet as data plane traffic, PE router 12 may forward the packet from an input interface to an output interface without applying the control plane firewall services, but may apply data plane firewall services.

In some embodiments of the invention, PE router 12 provides "stateful" firewall services to the control plane traffic in order to protect the router from security issues, such as an attack, without substantially affecting the performance of the router. As used herein, the term "stateful" firewall services refers to firewall services that provide inter-packet analysis, i.e., services that generate and maintain state information between control plane packets. Prior to processing the control plane traffic with a control plane, e.g., a routing component, PE router 12 may apply firewall services to detect a security issue, such as a network attack or other security anomalies. PE router 12 may apply, for example, one or more filters, application specific gateways (ADGs) to perform application-specific checks, anomaly detection modules, trend analysis modules, or other security services.

The control plane traffic that is not rejected by one of the security services is forwarded to the control plane of PE router 12. In addition, feedback information obtained from the analysis of the control plane traffic may also be communicated to the control plane, which may be used for dynamically updating filters or other security services to be applied by the PE router 12. The control plane may, for example, dynamically create one or more interface-specific filters to reject attack traffic being received on one of the interfaces. In this manner, the techniques of the invention may be used to detect and thwart attacks on PE router 12 without substantially affecting performance of the router, e.g., the router's forwarding capability for valid data and control plane traffic.

In one embodiment, PE router 12 includes a service card (not shown in FIG. 1) that assists in the application of the security services to the control plane traffic. The service card may, for example, provide stateful analysis of the control plane traffic to detect any network attack or security anomaly pattern. The service card in turn may provide feedback information to the control plane for dynamic update of the security services applied by PE router 12.

Although the techniques of the invention have been primarily described with respect to PE router 12, embodiments of the invention are not limited in this regard. Other network devices, such as routers within the core of a network or customer edge routers 18, may perform the functions described herein.

Figure 2:
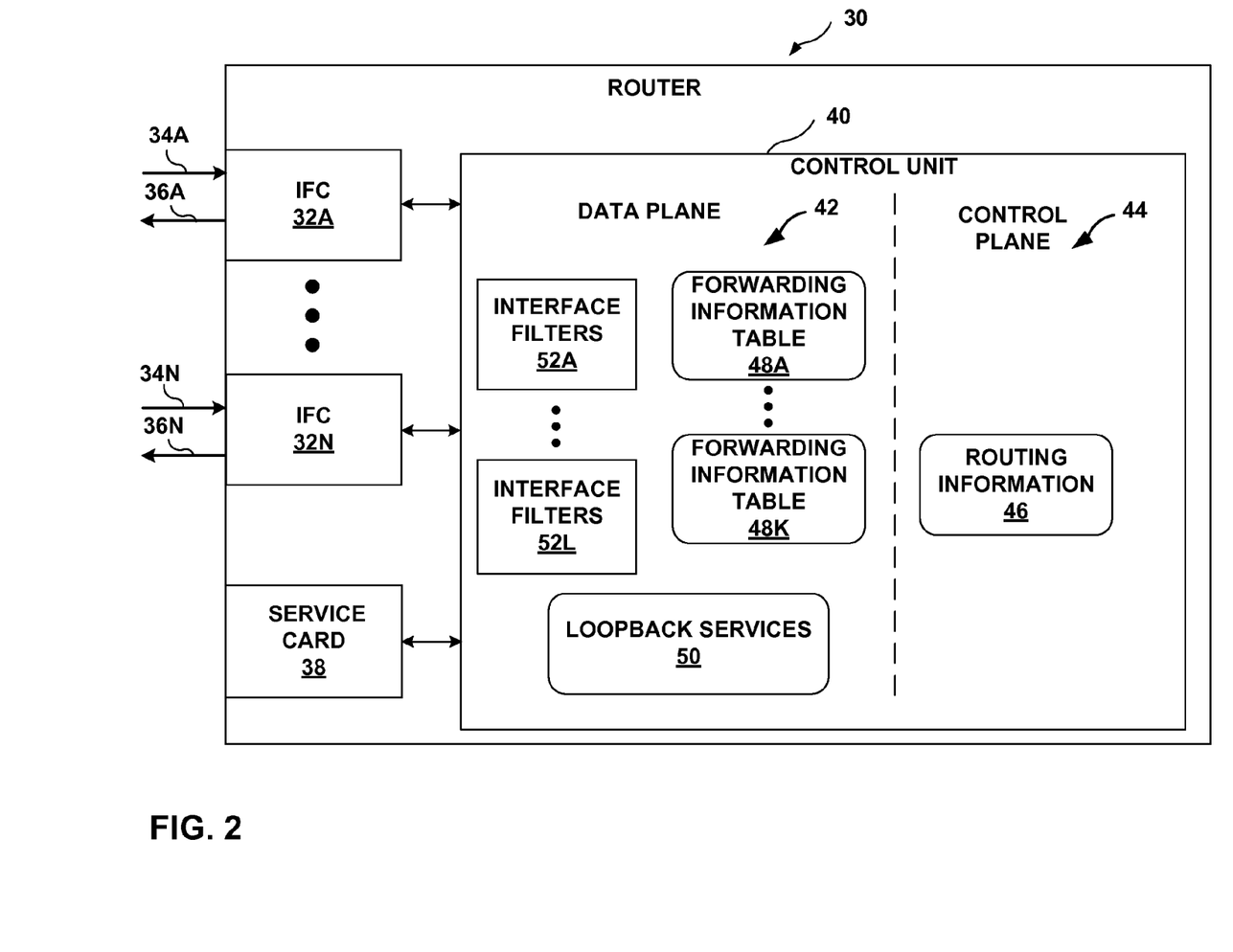
FIG. 2 is a block diagram illustrating an exemplary router that provides firewall services for control plane traffic in accordance with the principles of the invention.

FIG. 2 is a block diagram illustrating an exemplary router 30 that provides firewall services to control plane traffic in accordance with the principles of the invention. In this example, router 30 provides firewall services to the control plane traffic without affecting data plane traffic, i.e., traffic that is forwarded through router 30 to other devices. Router 30 may, for example, represent an embodiment of PE router 12 of FIG. 1.

Router 30 includes a set of one or more interface cards 32A-32N ("IFCs 32") for communicating packets via inbound links 34A-34N (collectively, "inbound links 34") and outbound links 36A-36N (collectively, "outbound links 36"). IFCs 32 may be coupled to inbound links 34 and outbound links 36 via a number of interface ports (not show in FIG. 2). In addition, router 30 includes a service card 38 that may apply stateful firewall services to control plane traffic, as described in detail below, and may provide other services as well.

Router 30 further comprises a control unit 40 that may generally be divided into a data plane 42 and a control plane 44. In this example, control plane 44 may be viewed as a routing component of control unit 40, while data plane 42 may be viewed as a forwarding component of the control unit.

For example, control plane 44 maintains routing information 46, which describes the topology of a network and, in particular, routes through the network. Routing information 46 may include, for example, route data that describes various routes within the network, and corresponding next hop data indicating appropriate neighboring devices within the network for each of the routes. Router 30 updates routing information 46 to accurately reflect the topology of the network using a routing protocol, such as the Border Gateway Protocol (BGP).

In accordance with routing information 46, data plane 42 maintains one or more forwarding information tables 48A-48K (collectively, "forwarding information tables 48") that associate network destinations with specific next hops and corresponding interface ports. Each of forwarding information tables 48 may be virtual forwarding instance associated with one or more specific customer networks. Control plane 44 generates forwarding information tables 48 in accordance with routing information 46. Although referred to as "tables" for purposes of illustration, forwarding information tables 48 may take the form of any of a number of data structures, such as databases, files, lists, arrays or other structures.

In general, data plane 42 forwards packets received from inbound links 34 to a corresponding next hop associated with destinations of the packets. When router 30 receives a packet via one of inbound links 34, for example, data plane 42 associates the packet with one of forwarding information tables 48. Data plane 42 then determines a destination and associated next hop for the packet in accordance with the associated one of forwarding tables 48. For a data plane packets, i.e., a packet destined for external devices, data plane 42 outputs the packet on an outbound link 36 based on the destination.

During this process, data plane 42 may apply one or more interface filters 52A-52L (collectively, "interface filters 52"). In general, interface filters 52 represent interface-specific filtering rules applied to packet flows. Interface filters 52 may, for example, discard packets when they contain specified information in its packet header or payload, perform policer functions by limiting the bandwidth of an interface, or perform checks on incoming packets. Data plane 42 may apply interface filters 52 upon receiving a packet on a particular one of interfaces 34, upon forwarding a packet to a particular one of outbound interfaces 36, or both. Interface filters 52 may further correspond to individual packet flows received from or forwarded to inbound interfaces 34 or outbound interfaces 36, respectively. In either case, interface filters 52 are typically applied on a packet-by-packet basis.

In the event data plane 42 determines that an inbound packet is destined for control plane 44, i.e., the packet is a "control plane packet," stateful firewall services may be applied to the packet prior to forwarding at to control plane 44. In particular, data plane 42 assigns the control plane packet a specific loopback interface based on the one of inbound interfaces 34 on which the control plane packet was received. Consequently, data plane 42 may assign a different loopback interface for different forwarding information tables 48. In this manner, different loopback interfaces may be used for different customers, allowing customer-specific firewall services to be applied.

After assigning the appropriate loopback interface, data plane 42 forwards the control plane packet to the assigned loopback interface. As a result, data plane 42 applies loopback services 50, which represent security mechanisms, such as access control lists (ACLs), that may be applied on a packet-by-packet basis.

Upon applying loopback services 50, instead of forwarding the control plane packet to control plane 44, data plane 42 redirects the packet to a firewall component, e.g., service card 38, that applies stateful firewall services. In this exemplary embodiment, service card 38 represents a physical card that may be inserted within router 30 and electrically coupled to control unit 40. Upon receiving control plane packets from data plane 42, service card 38 may perform one or more stateful firewall services to detect a network attack or other security anomaly.

Again, in this context, the term "stateful" firewall services refers to firewall services that provide inter-packet analysis, i.e., services that generate and maintain state information between control plane packets. In other words, service card 38 generates and maintains state information as control plane packets are received from data plane 40 in order to provide the firewall services. Service card 38 may, for example, analyze the control plane packets and perform protocol verification, anomaly detection, trend detection, abnormal behavior detection, limit checks or other security services.

If a network attack or other security anomaly is detected, service card 38 may reject and/or log all or a portion of the control plane packets. Otherwise, service card 38 forwards the control plane packet back to data plane 42. Upon receiving the control plane packets, data plane 42 forwards the control plane packets to control plane 44.

Service card 38 may output feedback communications to control plane 44 based on the packet analysis. The feedback communication may specify a form of a detected network attack or security anomaly, and may include additional information, such as an one or more of input interfaces 34 and IFCs 32 associated with the attack, protocol information, source and destination port information, source network address information or other information.

Control plane 44 may use the feedback communication provided by service card 38 to update forwarding information tables 48 and update interface filters 52 to be applied by data plane 42. Control plane 44 may, for example, dynamically create one or more interface filters 52 to reject the attack traffic upon being received on one of input interfaces 34. Once a threat is removed or no longer detected, service card 38 may direct control plane 44 to remove the dynamic filters. In some embodiments, service card 38 may associated a time period with a filter, and may direct control plane 44 to remove the filter upon expiration of the time frame. In this manner, embodiments of the invention may be used to detect and thwart attacks on router 30 without substantially affecting performance of the router, e.g., the router's forwarding capability for transit data plane traffic.

The functions of router 30 may be implemented by executing the instructions of the computer-readable medium with one or more processors, discrete hardware circuitry, firmware, software executing on a programmable processor, or a combination of any of the above. Moreover, data plane 42 and control plane 44 may be functionally integrated or separately. For example, data plane 42 and control plane 44 may be integrated or implemented separately as a routing engine and a forwarding engine. As another example, the functionality described with respect to data plane 42 may be distributed within IFCs 32. Moreover, router 30 may operate according to executable instructions fetched from a computer-readable medium (not shown). Examples of such media include random access memory (RAM), read-only memory (ROM), non-volatile random access memory (NVRAM), electrically erasable programmable read-only memory (EEPROM), flash memory, or other media.

Figure 3:
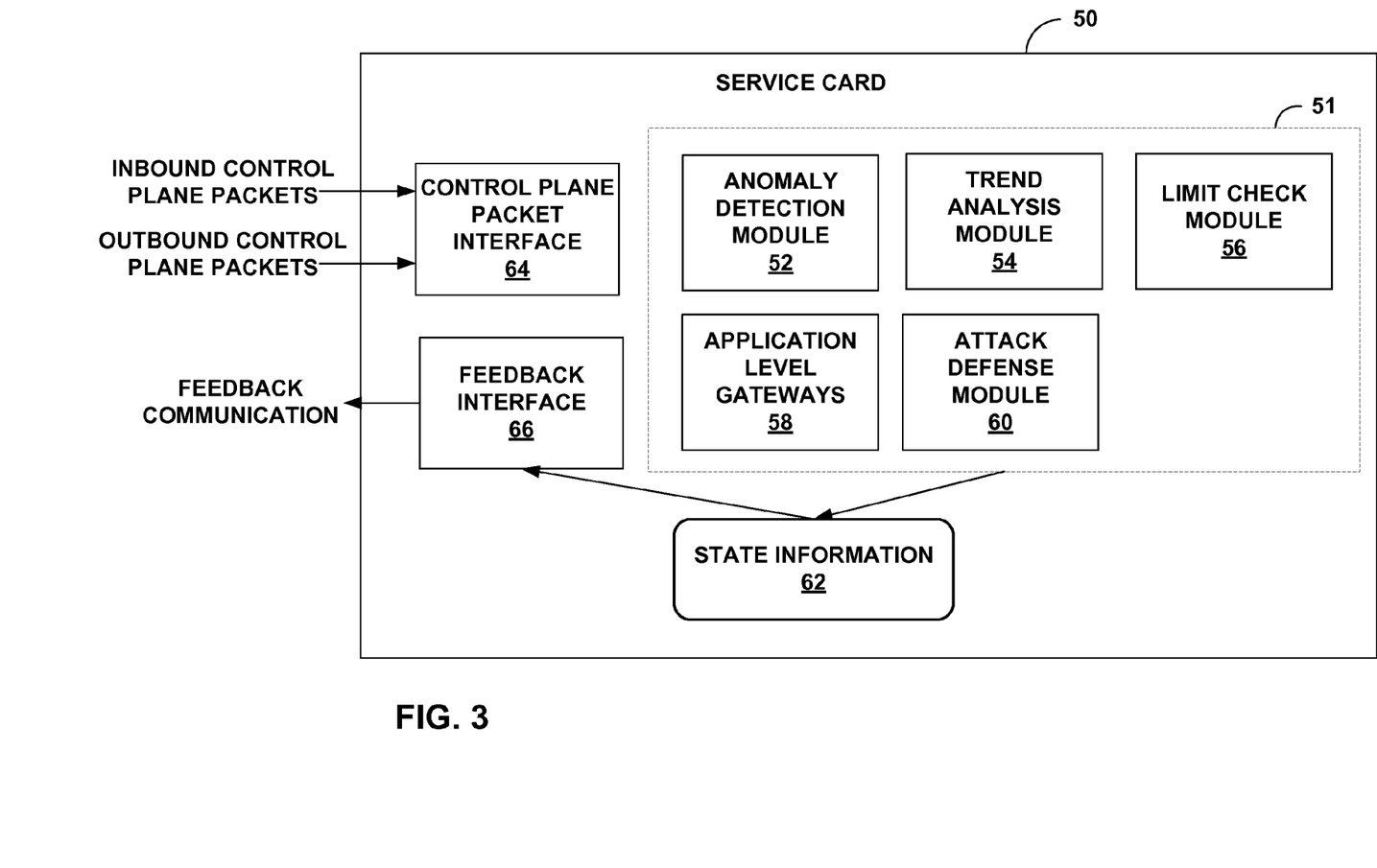
FIG. 3 is a block diagram of an example embodiment of a security service card that provides firewall services for a network device.

FIG. 3 is a block diagram of an example embodiment of a service card 50 that provides stateful firewall services for a network device in accordance with the principles of the invention. In the illustrated embodiment, service card 50 includes control plane packet interface 64 that receives control plane packets, e.g., from a data plane of a router or other network device in which the service card is installed. Control plane packet interface 64 buffers the control plane packets in memory for processing by packet analysis modules 51. Each of packet analysis modules 51 provides a security service, and may be implemented in software, hardware or combinations thereof. Moreover, although illustrated separately, packet analysis modules 51 may be implemented as functions, subroutines, software libraries, threads, processes or other modules, and may be readily combined.

Anomaly detection module 52 analyzes the control plane packets to detect any abnormal behavior, e.g., behavior that is inconsistent with routing or other network protocols. Trend analysis module 54 analyzes the control plane packets to detect trends that may reveal suspicious or malicious behavior. Limit check module 56 applies limit checks to the network protocols to ensure compliance. For example, limit check module 56 may operate in accordance with rules that limit the maximum number of sessions a user may open, e.g., 100 sessions. As another example, limit check module may perform trend analysis to ensure that a user does not open more than a defined number of sessions in a given interval, e.g, no more than ten sessions in a one second interval. Application level gateways 58 may also be used for protocol verification and compliance. Attack defense module 60 may be used to protect the host device in which security service card 50 is installed, e.g., a router, from network attacks. For example, attack defense module 60 may provide port scan protection, denial of service (DOS) protection, distributed DOS (DDOS) protection, TCP attack protection, SYN protection or other forms of protection using known defenses.

Packet analysis modules 51 generate and maintain state information 62 as the control plane packets are processed. Once processed, control plane packet interface 64 forwards the control plane packets, e.g., back to the originating data plane. If a security issue, such as a network attack or other security anomaly is detected, packet analysis modules 51 may direct control plane packet interface 64 to block all or a portion of the control plane packets.

Feedback interface 66 outputs feedback communications based on state information 62 generated by packet analysis modules 51. The feedback communications may specify a form of a detected network attack or security anomaly, and may include additional information, such as an one or more of input interfaces 34 and IFCs 32 associated with the attack, protocol information, source and destination port information, source network address information or other information.

The functions of service card 50 may be implemented by executing the instructions of the computer-readable medium with one or more processors, discrete hardware circuitry, firmware, software executing on a programmable processor, or a combination of any of the above. Service card 50 may, for example, include one or more processors, and may operate according to executable instructions fetched from a computer-readable medium (not shown). Examples of such media include random access memory (RAM), read-only memory (ROM), non-volatile random access memory (NVRAM), electrically erasable programmable read-only memory (EEPROM), flash memory, or other media.

Figure 4:
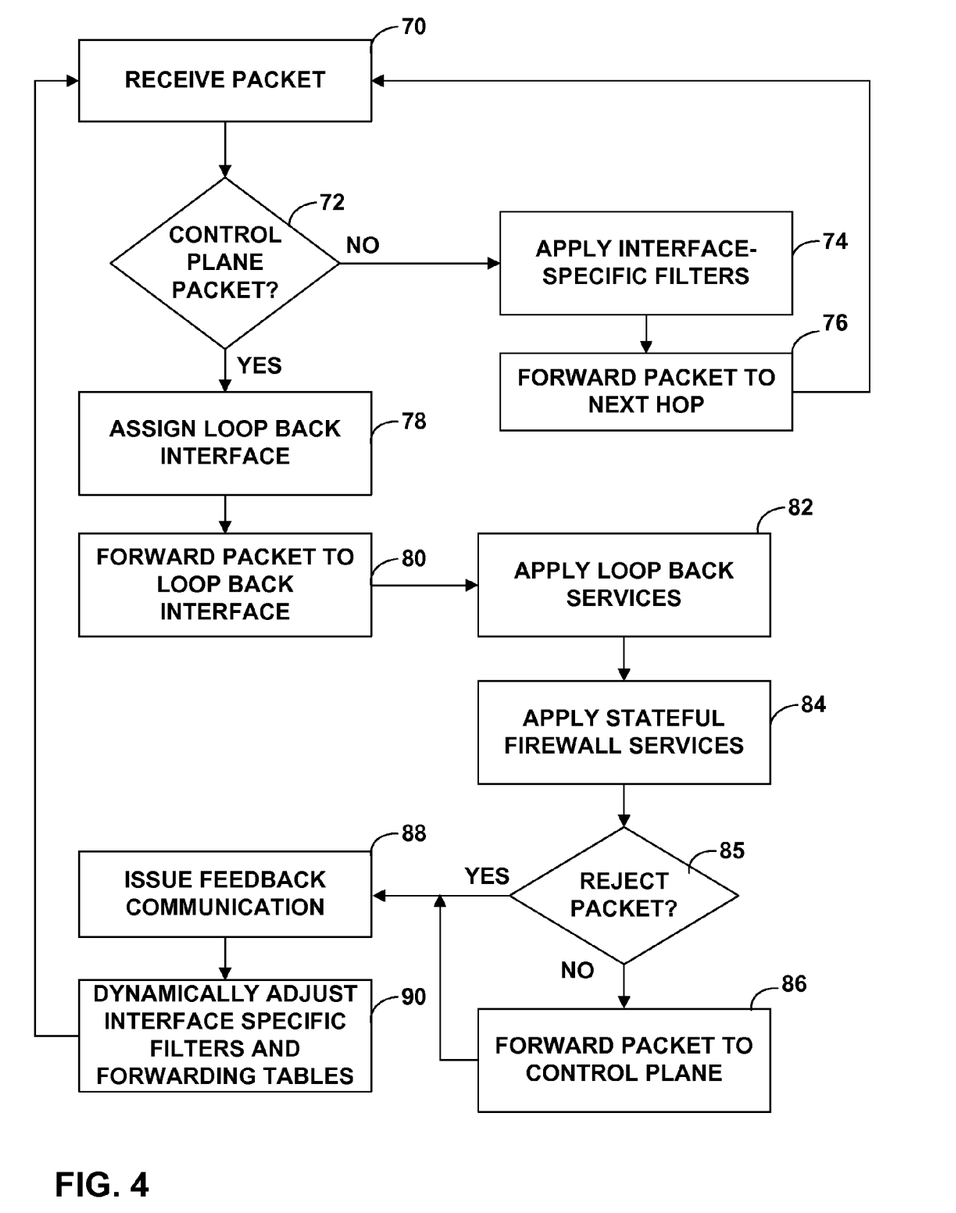
FIG. 4 is a flowchart illustrating exemplary operation of a network device in accordance with the principles of the invention.

FIG. 4 is a flowchart illustrating exemplary operation of a network device in accordance with the principles of the invention. For exemplary purposes, the flowchart is described in reference to router 30 of FIG. 2.

Initially, router 30 receives a packet via one of inbound links 34 (70). More specifically, one of IFCs 32 receives the packet and forwards the packet to data plane 42.

Upon receipt of the packet, data plane 42 determines whether the packet is a control plane packet or a data plane packet (72). In particular, data plane 42 associates the inbound packet with one of forwarding information tables 48, and determines a destination and associated next hop for the packet in accordance with the associated one of forwarding tables 48. Packets destined for external devices are considered transit data plane packets. Packets destined for control plane 44 are considered control plane packets.

In the event the packet is a data plane packet, data plane 42 may apply any interface-specific filters 52 associated with the designated output interface (74), and forward the packet to the next hop on an outbound link 36 (76).

In the event data plane 42 determines that the inbound packet is a control plane packet, data plane 42 assigns the control plane packet a loopback interface (78), and forwards the control plane packet to the assigned loopback interface (80). As a result, data plane 42 applies loopback services 50 (82), which represent security mechanisms, such as access control lists (ACLs), that may be applied on a packet-by-packet basis.

Upon applying loopback services 50, data plane 42 redirects the packet to a firewall component, e.g., service card 38, that applies stateful firewall services (84).

If a network attack or other security anomaly is detected, service card 38 may reject and/or log the control plane packet (85). Otherwise, service card 38 forwards the control plane packet back to data plane 42 for forwarding to control plane 44 (86).

In addition, service card 38 may output feedback communications to control plane 44 based on the packet analysis for use in updating forwarding information tables 48 and interface filters 52 to be applied by data plane 42 (88, 90).

In an alternative embodiment, data plane 42 applies does not redirect the control plane packets to service card 38, but applies sampling functions to the loop back interface. In this embodiment, data plane 42 forwards the control plane packets 42 to control plane 44, and forwards copies of all or a portion of the control plane packets to the service card. In this embodiment, service card 38 does not loop back the control plane packets for forwarding to control plane 44, and is unable to specifically reject the control plane packets. However, service card 38 applies stateful inspection, e.g., anomaly detection and trend analysis, and provides feedback communications to control plane 44 for thwarting network attacks and other security anomalies. As a result, this embodiment may be an even less invasive mechanism for applying stateful firewall services to the control plane packets.

Figure 5:
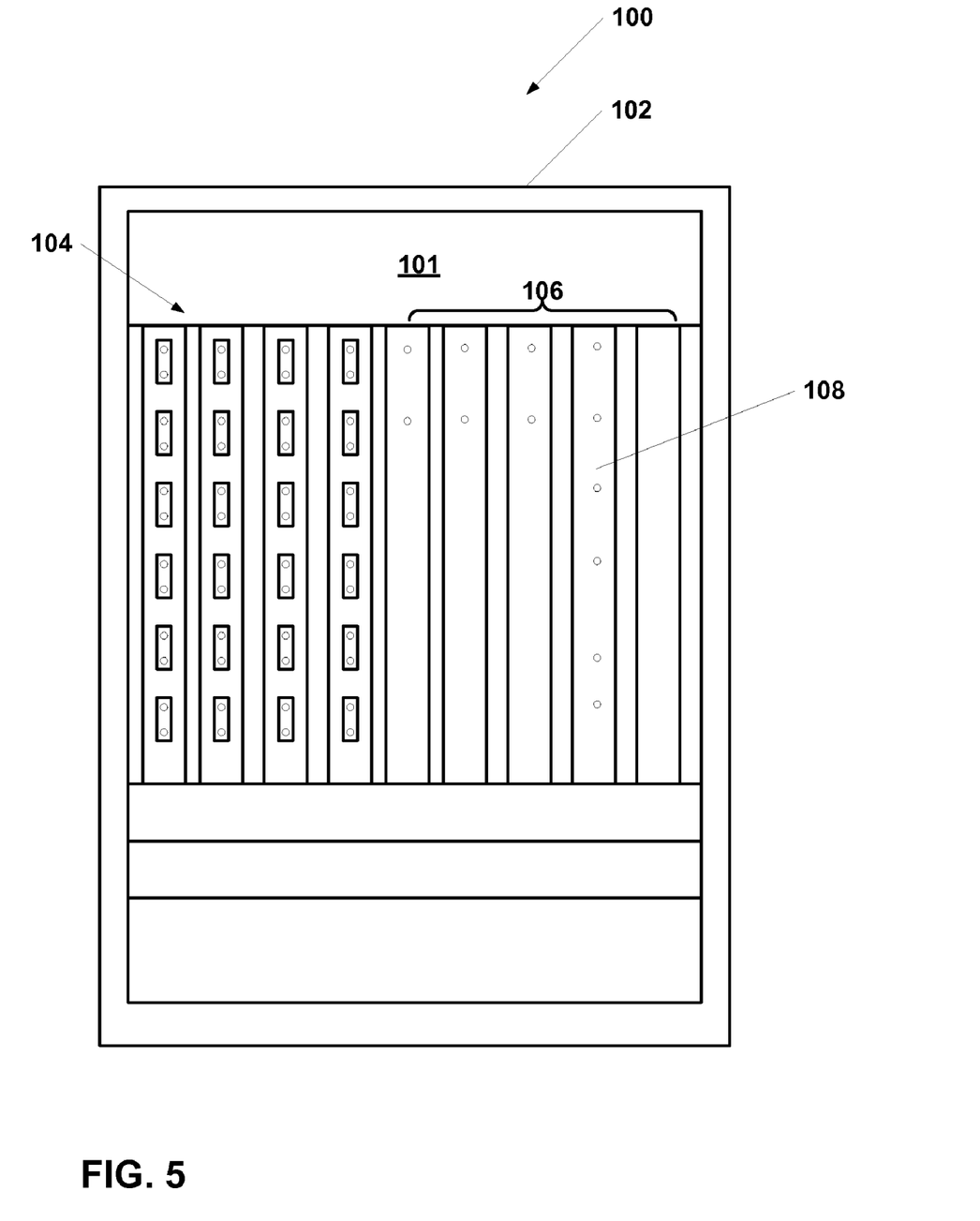
FIG. 5 is a schematic diagram illustrating an exemplary embodiment of a network router that provides stateful firewall services to control plane packets.

FIG. 5 is a schematic diagram illustrating an exemplary embodiment of a network router 100 that provides stateful firewall services to control plane packets in accordance with the principles of the invention. In the illustrated embodiment, network router 100 includes a chassis 102 for housing control unit 101 having a routing component and a forwarding component (not shown). In the illustrated example, chassis 100 has nine slots for receiving a set of cards. In this example, chassis 100 receives four interface cards (IFCs) 104 and five service cards 106, which include a service card 108 that may provide stateful firewall services to control plane traffic as described herein. Each of IFCs 104 and service cards 106 may be inserted into a corresponding slot of chassis 102 for electrically coupling the card to control unit 101 via a bus, backplane, or other electrical communication mechanism. In addition, IFCs 104 include ports for coupling to communication links Although not shown in this example, service card 106 may also include ports for coupling to communication links. Although only a single service card 108 capable of applying control plane firewall services is illustrated, multiple service cards may be utilized based on the amount of control plane traffic and the extent of the firewall services desired.

Various embodiments of the invention have been described. However, one skilled in the art will appreciate that additions or modifications may be made to the described embodiments without departing from the scope of the invention. For example, although the control plane firewall services are described herein as being performed by one or more service cards attached to a network device, in other embodiments consistent with the principles of the invention the control plane firewall services may performed by software, hardware, or a combination of software and hardware integrated with the network device. For example, control plane firewall services may be performed in the data plane, the control plane, or interface cards. Control plane firewall services may also be performed in a distributed fashion, such as partially in one or more service cards, the data plane, the control plane, the interface cards, or some combination of these. Moreover, although the techniques described herein have been primarily described as being implemented in a router, embodiments of the invention are not so limited. Other network devices, such as switches, hubs, routers within the core of a network, customer edge routers, gateways or other network devices may perform the functions described herein. These and other embodiments are within the scope of the following claims.

The invention claimed is:

1. A method for processing packets within a network device having a forwarding component, a routing component and a firewall component, the method comprising:
receiving control plane packets and data plane packets with the forwarding component of a network device, wherein the control plane packets are packets destined for a routing component within the network device and which specify a network address of the routing component, and wherein the data plane packets are packets received by the network device that are destined for devices external to the network device;
forwarding the control plane packets from the forwarding component to the firewall component within the network device prior to forwarding the control plane packets from the firewall component to the routing component of the network device, wherein the firewall component is physically separate from the forwarding component and the routing component and electrically coupled to the forwarding component and the routing component; and
processing the control plane packets with the physically separate firewall component to detect a network attack.

2. The method of claim 1, wherein receiving control plane packets and data plane packets comprises receiving the control plane packets and data plane packets with the forwarding component coupled to one or more physical interface cards.

3. The method of claim 2,
wherein the firewall component comprises a service card that provides an operating environment for firewall software, and
wherein forwarding the control plane packets comprises forwarding the control plane packets from the forwarding component to the service card for processing by the firewall software.

4. The method of claim 3, further comprising forwarding the control plane packets from the service card to the routing component after processing the control plane packets with the firewall software.

5. The method of claim 4,
issuing a feedback communication from the physically separate firewall component to the routing component based on the processing of the control plane packets by the physically separate firewall component;
wherein issuing a feedback communication comprises issuing a feedback communication from the service card to the routing component based on the processing of the control plane packets by the firewall software.

6. The method of claim 5, further comprising establishing one or more filters with the routing component in response to the feedback communication, wherein at least some of the one or more filters specify which control plane packets are to be directed from the forwarding component to the routing component.

7. The method of claim 1, wherein processing the control plane packets comprises performing stateful inspection of the packets to detect a security issue.

8. The method of claim 1, wherein processing the control plane packets comprises performing trend analysis on the control plane packets.

9. The method of claim 1, wherein processing the control plane packets comprises determining whether the control plane packets conform to one or more routing protocols by processing the packets with application level gateways (ALGs) specific to the routing protocols.

10. The method of claim 1, further comprising forwarding the control plane packets to the routing component after processing the control plane packets.

11. The method of claim 1, further comprising:
issuing a feedback communication from the physically separate firewall component to the routing component based on the processing of the control plane packets by the physically separate firewall component; and
establishing one or more filters with the routing component in response to the feedback communication.

12. A network device comprising:
a routing component that maintains routing information in accordance with a topology of the network;
an interface that receives control plane packets and data plane packets from a network, wherein the control plane packets are packets destined for a routing component within the network device and which specify a network address of the routing component, and wherein the data plane packets are packets received by the network device that are destined for devices external to the network device; and
a firewall component that processes the control plane packets to detect a security issue, wherein the firewall component is physically separate from the routing component and a forwarding component of the network device and electrically coupled to the routing component and the forwarding component; and
wherein the forwarding component receives the control plane packets from the interface and directs the control plane packets from the forwarding component to the physically separate firewall component for processing prior to the network device forwarding the control plane packets to the routing component.

13. The network device of claim 12, wherein the firewall component comprises a service card that provides an operating environment for firewall software, wherein the service card forwards the control plane packets to the routing component after processing the control plane packets with the firewall software.

14. The network device of claim 13, wherein the service card issues a feedback communication to the routing component based on the processing of the control plane packets by the firewall software, wherein the routing component establishes one or more filters in response to the feedback communication, wherein at least some of the one or more filters specify which control plane packets are to be directed from the forwarding component to the routing component.

15. The network device of claim 12, wherein the firewall component comprises a control packet interface that rejects at least a subset of the control plane packets without forwarding the rejected subset to the routing component.

16. The network device of claim 12, wherein the firewall component includes one or more packet analysis modules that perform stateful inspection of the packets to detect the security issue.

17. The network device of claim 12, wherein the firewall component includes a trend analysis module that performs trend analysis on the control plane packets.

18. The network device of claim 12, wherein the firewall component determines whether the control plane packets conform to one or more routing protocols.

19. The network device of claim 12, wherein the firewall component includes one or more application level gateways (ALGs) to perform application level checks on the control plane packets.

20. The network device of claim 12, wherein the forwarding components mirrors the control plane packets to generate a first stream of control plane packets and a second stream of the control plane packets, and forwards the first stream of the control plane packets to the routing component and the second stream of the control plane to the firewall component.

21. The network device of claim 12, further comprising:
an interface associated with the routing component,
a service card;
wherein the forwarding component redirects the control plane packets to the service card upon determining that the control plane packets are destined for the interface associated with the routing component,
wherein the service card receives the control plane packets and loops the control plane packets back to the forwarding component for communication to the routing component; and
wherein the firewall component is applied to the control plane packets as a service upon entering or exiting the service interface card.

22. A non-transitory computer-readable storage medium comprising instructions that cause a processor to:
receive control plane packets and data plane packets within a forwarding component of a router, wherein the control plane packets are packets destined for a routing component within the network device and which specify a network address of the routing component, and wherein the data plane packets are packets received by the network device that are destined for devices external to the network device;
forward the data plane packets to an output interface in accordance with routing information without processing the data plane packets with firewall software of the network device that is maintained in a firewall component physically separate from and electrically connected to the routing component and forwarding component;
forward the control plane packets from the forwarding component to the physically separate firewall component within the network device prior to forwarding the control plane packets from the physically separate firewall component to the routing component of the network device;
forward the control plane packets from the physically separate firewall component to the routing component after the control plane packets are processed with the firewall software of the physically separate firewall component.

23. The computer-readable storage medium of claim 22, wherein the physically separate firewall component comprises a service card,
wherein the instructions cause the processor to forward the control plane packets to the service card for processing with the firewall software, and
wherein the instructions cause the processor to receive a feedback communication from the service card, and forward the feedback communication from the service card to the control plane.

* * * * *